(12) United States Patent
Bittner et al.

(10) Patent No.: US 10,434,914 B2
(45) Date of Patent: Oct. 8, 2019

(54) ARMREST SYSTEM FOR HOLDING MONITORS IN AN OPERATOR CAB

(71) Applicant: CNH Industrial America LLC, New Holland, PA (US)

(72) Inventors: Roy A. Bittner, Cato, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 291 days.

(21) Appl. No.: 15/457,047

(22) Filed: Mar. 13, 2017

(65) Prior Publication Data

US 2018/0257521 A1    Sep. 13, 2018

(51) Int. Cl.
*B60N 2/75* (2018.01)
*B60R 11/02* (2006.01)
*B60N 2/64* (2006.01)
*B60R 11/00* (2006.01)

(52) U.S. Cl.
CPC .............. *B60N 2/797* (2018.02); *B60N 2/64* (2013.01); *B60R 11/0229* (2013.01); *B60R 11/0264* (2013.01); *B60R 2011/008* (2013.01); *B60R 2011/0014* (2013.01)

(58) Field of Classification Search
CPC ....... B60N 2/64; B60N 2/797; B60R 11/0229; B60R 11/0264; B60R 2011/0014; B60R 2011/008
See application file for complete search history.

(56) References Cited

U.S. PATENT DOCUMENTS

| | | | | |
|---|---|---|---|---|
| 3,592,144 A | * | 7/1971 | Futrell | A47B 31/06 108/44 |
| 4,500,134 A | * | 2/1985 | Kaneko | A61G 15/14 108/137 |
| 4,842,174 A | * | 6/1989 | Sheppard | B60R 11/02 108/45 |
| 4,946,120 A | * | 8/1990 | Hatcher | B60R 11/0252 108/44 |

(Continued)

FOREIGN PATENT DOCUMENTS

DE    20310327 U1    10/2003

OTHER PUBLICATIONS

Loctek; Loctek Dual Monitor Laptop Mount Arm Height Adjustable Articulating for 10"-27" LED/LCD/PDP Computer Monitor for Samsung/Dell/Asus/HP/AOC; Feb. 11, 2016; Retrieved from website: http://www.newegg.com/Product/Product.aspx?Item=9SIA67A2WH2473; US.

*Primary Examiner* — James M Ference
(74) *Attorney, Agent, or Firm* — Rebecca L. Henkel; Rickard K. DeMille (57) ABSTRACT

The armrest of an operator's chair in a cab of an agricultural machine is configured to include a support attachment for enabling multiple touchscreens to be supported by and oriented with the chair. The support attachment allows multiple arms supporting the touchscreens to be joined below the armrest. The multiple arms can advantageously rotate around an axis defined by the support attachment, and the touchscreens can advantageously move to face multiple directions and lock in a desired position. As a result, when an operator adjusts the seat in the cab for optimum driving conditions, the touchscreens can better adjust with the operator accordingly.

18 Claims, 4 Drawing Sheets

(56) References Cited

U.S. PATENT DOCUMENTS

| | | | | |
|---|---|---|---|---|
| 5,076,524 A * | 12/1991 | Reh | B60N 2/79 | 248/296.1 |
| 5,127,617 A * | 7/1992 | Bergetz | F16M 11/08 | 108/48 |
| 5,177,616 A * | 1/1993 | Riday | B64D 11/0015 | 248/917 |
| 5,398,991 A * | 3/1995 | Smith | A47C 7/72 | 248/919 |
| 5,409,079 A * | 4/1995 | Strong | B60K 20/00 | 180/326 |
| 5,485,793 A * | 1/1996 | Crowell | A47B 23/04 | 108/44 |
| 5,615,620 A * | 4/1997 | Owen | A47B 23/04 | 108/150 |
| 5,673,628 A * | 10/1997 | Boos | B60N 3/001 | 108/138 |
| 5,709,360 A * | 1/1998 | Rosen | B64D 11/0015 | 248/278.1 |
| 5,751,548 A * | 5/1998 | Hall | F16C 11/10 | 248/122.1 |
| 5,765,911 A * | 6/1998 | Sorenson | A47C 7/70 | 248/284.1 |
| 5,924,515 A * | 7/1999 | Stauffer | B60N 2/38 | 180/326 |
| 6,039,141 A * | 3/2000 | Denny | B60N 2/797 | 180/329 |
| 6,158,793 A * | 12/2000 | Castro | B60R 11/02 | 224/548 |
| 6,179,263 B1 * | 1/2001 | Rosen | B60R 11/0235 | 248/278.1 |
| 6,213,438 B1 * | 4/2001 | Ostby | B60R 11/0252 | 224/539 |
| 6,259,475 B1 * | 7/2001 | Ramachandran | B60Q 1/0023 | 348/117 |
| 6,315,252 B1 * | 11/2001 | Schultz | B60R 11/0252 | 108/44 |
| 6,381,133 B1 * | 4/2002 | Chen | B60R 11/0252 | 248/918 |
| 6,382,745 B1 * | 5/2002 | Adkins | B60N 3/002 | 108/97 |
| 6,386,413 B1 * | 5/2002 | Twyford | B60R 11/0252 | 108/138 |
| 6,412,426 B1 * | 7/2002 | Holloway, Jr. | B60R 11/02 | 108/44 |
| 6,517,040 B1 * | 2/2003 | Wen | F16C 11/10 | 248/278.1 |
| 6,585,201 B1 * | 7/2003 | Reed | B60R 11/0235 | 248/181.1 |
| 6,629,572 B2 * | 10/2003 | Womer | E21B 44/00 | 175/219 |
| 6,715,269 B2 * | 4/2004 | Nanlawala | A01D 41/12 | 180/329 |
| D497,394 S * | 10/2004 | Svanson | D21/329 | |
| 7,121,514 B2 * | 10/2006 | Twyford | B60R 11/0235 | 248/177.1 |
| 7,232,265 B1 * | 6/2007 | Price | F16M 11/14 | 248/187.1 |
| 7,233,487 B2 * | 6/2007 | Stinson | B60R 11/0252 | 248/918 |
| 7,446,650 B2 * | 11/2008 | Scholfield | B60C 23/00 | 340/438 |
| 7,635,045 B2 * | 12/2009 | Shearer | E02F 9/2004 | 180/315 |
| 7,806,470 B2 * | 10/2010 | Steege | B60N 2/797 | 297/188.17 |
| 7,825,951 B2 * | 11/2010 | Lang | B60R 1/12 | 340/438 |
| 7,852,622 B2 * | 12/2010 | Ferren | B60K 35/00 | 248/917 |
| 7,857,311 B2 * | 12/2010 | Minke | A63F 13/02 | 273/148 R |
| 7,946,542 B1 * | 5/2011 | Chapman | B60R 11/0252 | 248/122.1 |
| 8,191,487 B2 * | 6/2012 | Theesfeld | A47B 57/06 | 108/106 |
| 8,197,341 B2 * | 6/2012 | Gray | A63F 13/02 | 463/36 |
| D664,998 S * | 8/2012 | Warr | D15/28 | |
| 8,272,604 B2 * | 9/2012 | Foster | B60R 11/0252 | 248/124.1 |
| 8,309,907 B2 * | 11/2012 | Heslin | B60R 1/04 | 250/208.1 |
| 8,430,370 B2 * | 4/2013 | Steege | B60R 11/0235 | 248/292.14 |
| 8,668,257 B2 * | 3/2014 | Wu | A47C 7/70 | 248/446 |
| D710,785 S * | 8/2014 | Jacobsthal | D12/415 | |
| 8,944,395 B2 * | 2/2015 | Bonito | B60R 11/0235 | 248/276.1 |
| D725,581 S * | 3/2015 | Ringer | D12/415 | |
| 8,985,263 B2 * | 3/2015 | Peterson | E21F 13/025 | 180/329 |
| D727,246 S * | 4/2015 | Sachtleben | D12/415 | |
| 9,016,213 B2 * | 4/2015 | Tajbakhsh | A47B 21/00 | 108/103 |
| 9,056,587 B2 * | 6/2015 | Montgomery | B60R 11/0229 | |
| 9,057,221 B2 * | 6/2015 | Warr | E21B 7/02 | |
| D748,566 S * | 2/2016 | Jacobsthal | D12/415 | |
| D758,284 S * | 6/2016 | Ringer | D12/415 | |
| 9,518,375 B2 * | 12/2016 | Uchida | E02F 9/16 | |
| 2002/0066392 A1 * | 6/2002 | Calam | B60R 11/0252 | 108/33 |
| 2003/0042378 A1 * | 3/2003 | Imamura | B60R 11/0235 | 248/274.1 |
| 2003/0057340 A1 * | 3/2003 | Mann | B60R 11/02 | 248/274.1 |
| 2003/0230447 A1 * | 12/2003 | Wulfert | B60N 2/143 | 180/329 |
| 2003/0234550 A1 * | 12/2003 | Brooks | B60R 7/04 | 296/24.46 |
| 2004/0016588 A1 * | 1/2004 | Vitale | B60K 37/00 | 180/322 |
| 2006/0042857 A1 * | 3/2006 | Catton | B60N 2/767 | 180/334 |
| 2008/0029669 A1 * | 2/2008 | Olah | B60R 11/0229 | 248/276.1 |
| 2009/0163283 A1 * | 6/2009 | Childress | A63F 13/08 | 463/47 |
| 2010/0300796 A1 * | 12/2010 | Ryan | B60K 26/00 | 180/329 |
| 2012/0193930 A1 * | 8/2012 | Wihinen | B60K 35/00 | 296/24.34 |
| 2013/0068915 A1 * | 3/2013 | Yang | F16M 11/041 | 248/551 |
| 2014/0176717 A1 * | 6/2014 | De Paschoal | B60R 11/04 | 348/148 |
| 2014/0225402 A1 * | 8/2014 | Dehli | A47C 7/70 | 297/173 |
| 2014/0265460 A1 * | 9/2014 | Voigt | A47B 83/02 | 297/61 |
| 2014/0320768 A1 * | 10/2014 | Hagiwara | B60K 35/00 | 349/12 |
| 2014/0365031 A1 * | 12/2014 | Harrison | G05D 1/0016 | 701/2 |
| 2015/0173291 A1 * | 6/2015 | Muller | B60D 1/246 | 280/478.1 |
| 2015/0217702 A1 * | 8/2015 | Jacobsthal | A01D 41/12 | 296/190.01 |
| 2015/0329062 A1 * | 11/2015 | Ackeret | B60R 11/02 | 248/220.22 |
| 2016/0355111 A1 * | 12/2016 | Randleman | B60N 2/0228 | |
| 2017/0008430 A1 * | 1/2017 | Randleman | B60N 2/38 | |
| 2017/0013964 A1 * | 1/2017 | Ravn | A47B 21/0314 | |
| 2018/0257521 A1 * | 9/2018 | Bittner | B60R 11/0229 | |

\* cited by examiner

ARMREST SYSTEM FOR HOLDING MONITORS IN AN OPERATOR CAB

FIELD OF THE INVENTION

The invention relates generally to agricultural product application equipment such as self-propelled sprayers and, in particular, to an armchair for agricultural machines, the armchair having an, armrest system which includes one or more aims in communication with a support attachment for holding a monitor which can face multiple directions and which can be locked in a desired position.

BACKGROUND OF THE INVENTION

High-clearance sprayers, are getting larger and more complex to allow for increasing coverage in a single pass, which improves application efficiency. These high-clearance sprayers have sophisticated product delivery and vehicle control systems that require numerous operator controls and electronic displays. Currently, the electronic displays include a screen such as an HMI (Human Machine Interface), for interacting with machine control modules, that is fixedly mounted to a dashboard of an upper console in the cab. A second screen, which could be a virtual terminal (VT) or a field computer, may be fixedly mounted above the HMI. The HMI and the VT can both be touchscreen displays, and consequently, can require the operator to touch the screens in addition to viewing them.

However, when operators adjust their seat in the cab for optimum driving conditions, some operators may feel too close to the touchscreen displays while others may feel, too far from the touchscreen displays. Moreover, the fixed positions of the touchscreens can make avoiding screen glare difficult at times. A need therefore exists to improve the operator cab that eliminates one or more of the foregoing disadvantages.

SUMMARY OF THE INVENTION

The armrest of an operator's chair in a cab of an agricultural machine is configured to include a support attachment for enabling multiple touchscreens to be supported by and oriented with the chair. The support attachment allows multiple arms supporting the touchscreens to be joined below the armrest. The multiple arms can advantageously rotate around an axis defined by the support attachment, and the touchscreens can advantageously move to face multiple directions and lock in a desired position. As a result, when an operator adjusts the seat in the cab for optimum driving conditions, the touchscreens can better adjust with the operator accordingly.

According to an aspect, touchscreen displays can be movably mounted inside the cab. A pair of movable arms can support the machine control module and VT touchscreen displays. Each arm can have a top end with a ball and socket infinite adjustment mount and bottom end with a collar. The collars of the aims can be longitudinally/coaxially aligned and vertically stacked. The collar stack can be suspended from above by a knuckle. A bolt can extend from below the collar stack, upwardly through the collar stack, and thread into the knuckle to define a common axis of rotation for the collars of the collar stack. Smooth polymeric washers can be arranged between the collars and above and below the collar stack. Melville washers can be arranged above and below the collar stack to preload the collar stack in an axial direction. Each collar can have a lobe that extends from its outer surface, with a front end of a lock mechanism attached to the lobe. Each lock mechanism can have a back end that is connected to a bracket below an armrest of the operator's seat. The lock mechanisms can be locking gas springs, which can be detuned with relatively light springs. Locking and unlocking the gas springs can be done by tabs or buttons on the gas springs themselves or can be done remotely by tabs or buttons that are connected to the gas springs by cables. For better cost effectiveness, one version can fixedly mount one or more of the arms with a solid link instead of a gas spring. Accordingly, operators can unlock the touchscreen display(s), move the touchscreen display(s) to position them within comfortable reach, sight, and to avoid screen, glare, and then lock the touchscreen display(s) in that adjusted position.

Specifically then, one aspect of the present invention may provide an armrest system for an agricultural machine including: an armrest; a support attachment connected to the armrest; and an arm in communication with the support attachment, the arm having an upper end providing a support assembly for holding a monitor. The support assembly can provide movement for allowing a monitor to face multiple directions. The support assembly can include a support assembly lock for inhibiting the movement when the support assembly lock is engaged.

Another aspect may provide an armchair for an agricultural machine including: a seat; a backrest connected to the seat; and an armrest system connected to the seat. The armrest system can include: (a) an armrest; (b) a support attachment connected to the armrest; and (c) an arm in communication with the support attachment. The arm can have an upper end providing a support assembly for holding a monitor. The support assembly can provide movement for allowing a monitor to face a multiple directions. The support assembly can include a support assembly lock for inhibiting the movement when the support assembly lock is engaged.

Another aspect may provide an armchair for an agricultural machine including: a seat; a backrest connected to the seat; and an armrest system connected to the seat. The armrest system can include: (a) an armrest; (b) a support attachment connected to the armrest; (c) a first arm in communication with the support attachment, the first arm having an upper end providing a support assembly holding a first monitor; and (d) a second arm in communication with the support attachment, the second arm having an upper end providing a support assembly holding a second monitor. The support assemblies of the first and second arms can each provide movement for allowing the first and second monitors, respectively, to face multiple directions. The support assemblies of the first and second arms can each include a support assembly lock for inhibiting the movement when the support assembly lock is engaged.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
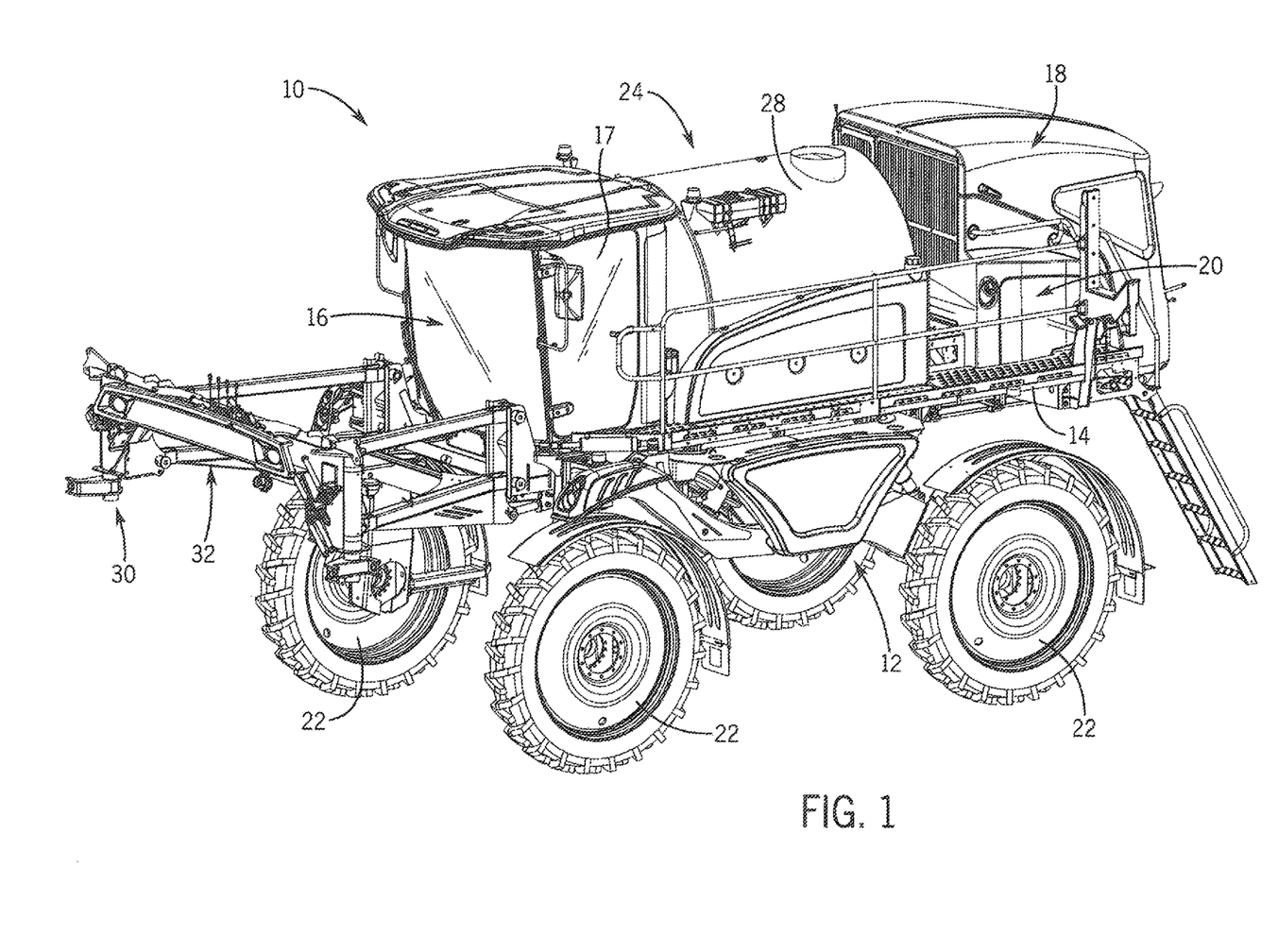
FIG. 1 is an isometric view of an agricultural machine.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including, the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
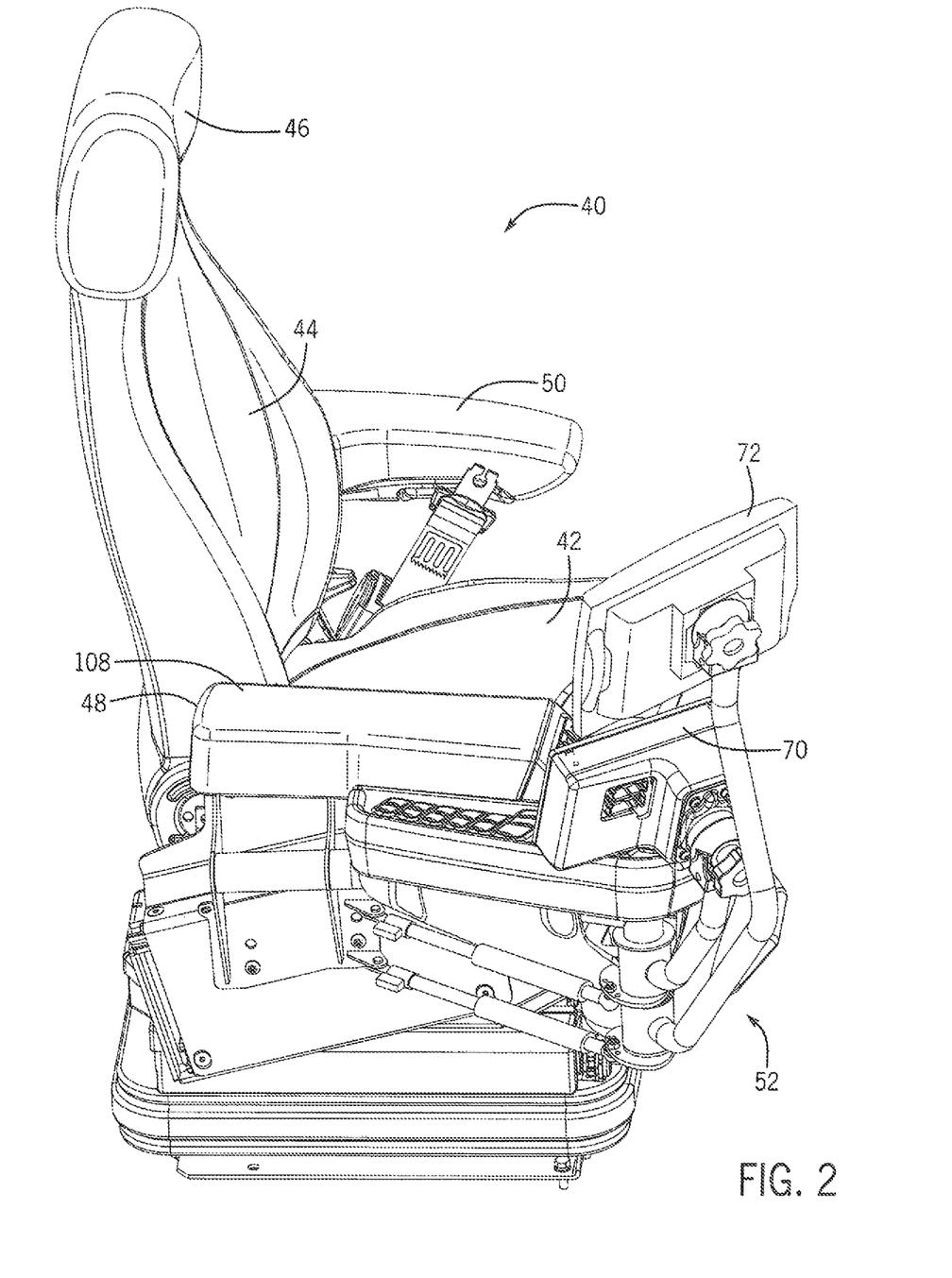
FIG. 2 is an isometric view of an armchair having an armrest having an armrest system according to an aspect of the invention.

Referring now to FIG. 2, in the operator cab 16, an armchair 40 is provided for adjustment and use by an operator of the sprayer 10. The armchair 40 can, include a seat 42, a backrest 44 connected to the seat 42, a headrest 46 connected to the backrest 44, and first and second armrests 48 and 50, respectively, connected to portions of the seat 42 and the backrest 44 on opposing sides. The seat can be electrically/mechanically adjustable by the operator to achieve a desired position for optimum driving conditions, such as moving or tilting forward, backward or laterally.

Figure 3:
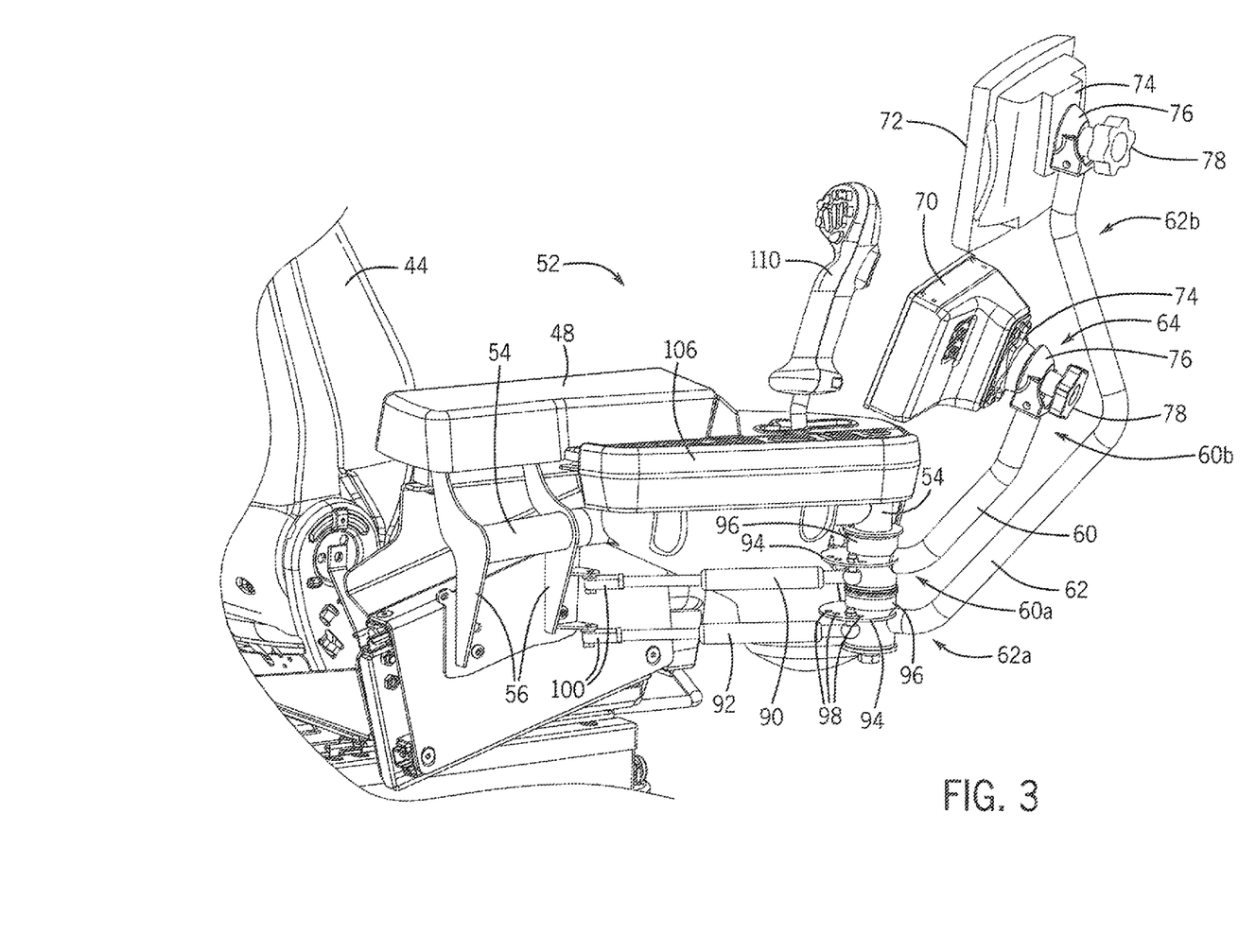
FIG. 3 is a detailed view of the armrest system of FIG. 2.

With additional reference to FIG. 3, in one aspect, the first armrest 48 can be enhanced to be part of an armrest system 52. In particular, in the armrest system 52, the first armrest 48 can connect to a support attachment 54. The support attachment 54 can include a frame member extending longitudinally along a side of the armchair 40 with multiple connecting brackets 56 for connecting to the first armrest 48. In addition, the support attachment 54 can include a knuckle or other receiver at a forward position with respect to the armchair 40, which can be threaded for joining first and second arms 60 and 62, respectively. The first and second arms 60 and 62, respectively, can each have first and second arm lower ends 60a and 62a, respectively, in communication with the support attachment 54. The first and second arms 60 and 62, respectively, can also each have first and second arm upper ends 60b and 62b, respectively, which may provide first and second support assemblies 64 and 66, respectively. The first and second support assemblies 64 and 66, respectively, in turn, can hold first and second touchscreen monitors 70 and 72, respectively, such as an HMI or VT. Moreover, the first arm 60 can be shorter than the second arm 62, so that the first touchscreen monitor 70, supported by the first arm 60 can be readily positioned below the second touchscreen monitor 72, supported by the second arm 62.

The first and second support assemblies 64 and 66, respectively, can each provide movement for allowing the monitors 70 and 72, respectively, to face multiple directions. Each support assembly can include a plate 74 with apertures for mounting the monitor to the plate with fasteners such as screws. Each support assembly can also include a ball and socket arrangement 76 allowing an infinite range of adjustment for the monitors to face multiple directions. In addition, each support assembly can include a support assembly lock 78 for inhibiting the movement when the support assembly lock is engaged. The support assembly lock 78 could be a knob which an operator can turn clockwise to tighten the ball and socket arrangement 76 to engage the lock or turn counter-clockwise to loosen the ball and socket arrangement 76 to disengage the lock.

Figure 4:
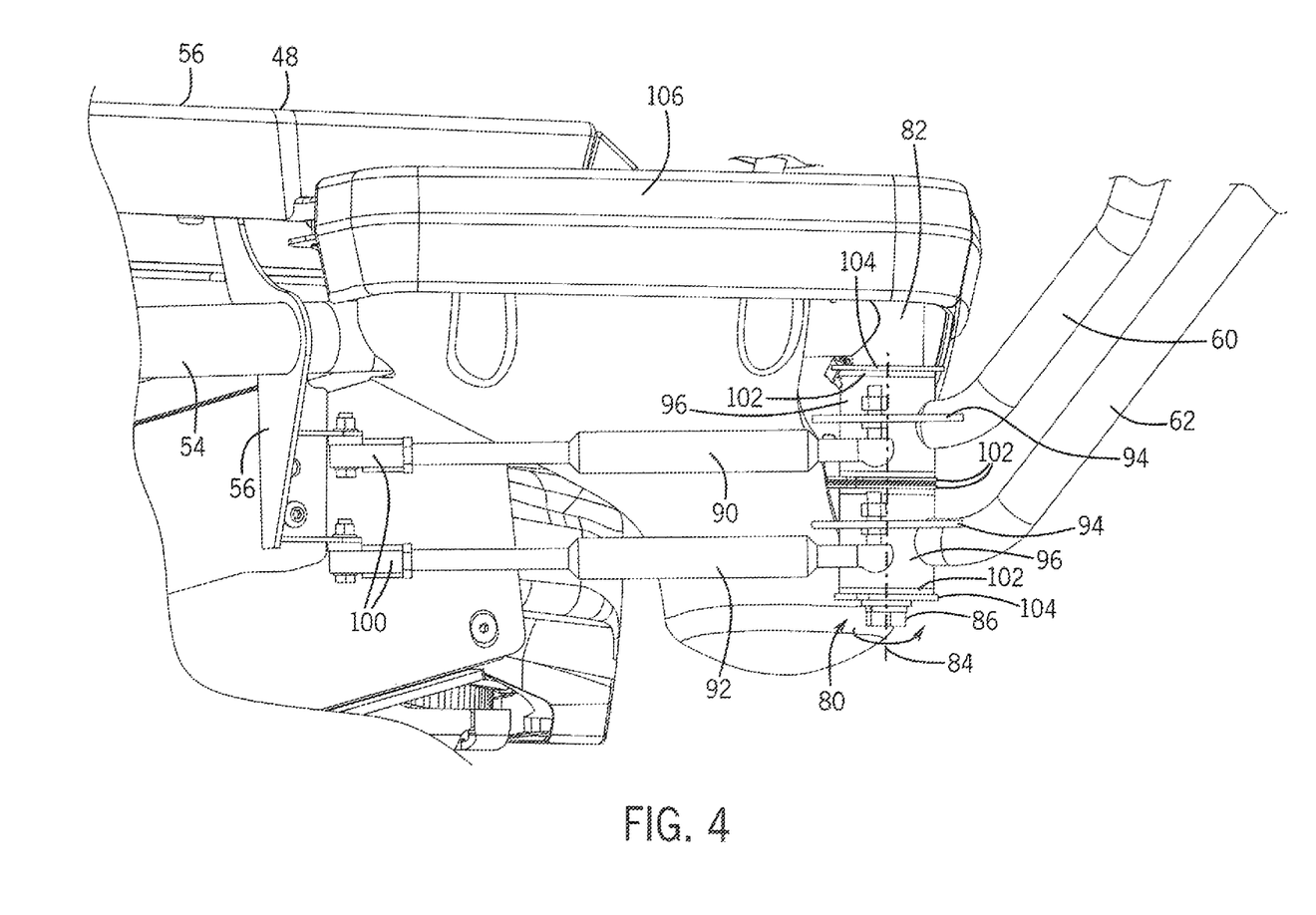
FIG. 4 is a detailed view of a support attachment for the armrest system of FIG. 2.

With additional reference to FIG. 4, the first and second arm lower ends 60a and 62a, respectively, of the first and second arms 60 and 62, respectively, can be joined to the support attachment 54 to form a collar stack 80 that is suspended from above by a knuckle 82 of the support attachment 54 which can be threaded. Moreover, the first and second arm lower ends 60a and 62a, respectively, of the first and second arms 60 and 62, respectively, can be configured to independently provide rotation around an axis 84 defined by the support attachment 54 from through a location in which the support attachment 54 connects to the collar stack 80. A fastener 86, which can be a screw, is aligned with the axis 84 and can pass upwardly through the collar stack 80 for fastening to the support attachment 54 to join the first and second arm lower ends 60a and 62a, respectively, to the support attachment 54.

First and second rotation locks 90 and 92, respectively, can be joined to the first and second arm lower ends 60a and 62a, respectively. The first and second rotation locks 90 and 92, respectively, can be independently configured to stop the aforementioned rotation around the axis 84 when the respective rotation locks are engaged. Each of the first and second rotation locks 90 and 92, respectively, can connect to a lobe 94 extending from a collar 96 of a lower end of an arm. Moreover, each lobe 94 can include multiple apertures 98, with a rotation lock being connected to one of the apertures 98. The first and second rotation locks 90 and 92, respectively, can be mounted from a connecting bracket 56. The first and second rotation locks 90 and 92, respectively, can also include tabs 100 which can selectively engage or disengage locking to inhibit or allow movement. If the tab 100 is engaged, the respective rotation lock is inhibited from moving, thereby preventing the respective lower end (and respective collar 96) from rotating around the axis 84. Conversely, if the tab 100 is disengaged, the respective rotation lock is allowed to move, thereby allowing the respective arm lower end (and respective collar 96) to rotate around the axis 84 according to a maximum length of the respective rotation lock. The first and second rotation locks 90 and 92, respectively, can be hydraulic cylinders or locking gas springs which can be tuned or detuned.

In the collar stack 80, smooth polymeric washers 102 can be arranged above and below the collars 96 of the first and second arm lower ends 60a and 62a of the first and second arms 60 and 62, respectively. The smooth polymeric washers 102 can facilitate ease of rotation for the first and second arms 60 and 62, respectively, when the respective rotation locks are disengaged. In addition, Belville washers 104, or similar washers which can be loaded along its axis either statically or dynamically, can be arranged above and below the collar stack 80 to preload the collar stack in a direction of the axis 84.

The armrest system 52 can further include an instrument panel 106 coupled to the armrest 48. The instrument panel 106 can include multiple controls for operating the sprayer 10, including a buttons 108, as may best be seen in FIG. 2, and/or a joystick 110, as may best be seen in FIG. 3. Accordingly, when an operator adjusts the armchair 40 in the cab 16 for optimum driving conditions, the first and second touchscreen monitors 70 and 72, respectively, can better be adjusted with the operator. In another aspect, the second armrest 50, in addition to, or alternatively with, the first armrest 48, could be enhanced to be part an armrest system according to the invention, such as the armrest system 52.

Accordingly, in an aspect of the invention, touchscreen displays can be movably mounted inside the cab 16. A pair of movable arms can support a machine control module and VT touchscreen displays. Each arm can have a top end with a ball and socket infinite adjustment mount and bottom end with a collar. The collars of the aims can be longitudinally/coaxially aligned and vertically stacked. The collar stack 80 can be suspended from above by a knuckle 82. A bolt or other fastener can extend from below the collar stack 80, upwardly through the collar stack 80, and thread into the knuckle 82 to define a common axis 84 of rotation for the collars of the collar stack 80. Smooth polymeric washers 102 can be arranged between the collars and above and, below the collar stack 80. Belville washers 104 can be arranged above and below the collar stack 80 to preload the collar stack in an axial direction. Each collar can have a lobe 94 that extends from its outer surface, with a front end of a lock mechanism attached to the lobe. Each lock mechanism can have a back end that is connected to a bracket below an armrest of the operator's seat. The lock mechanisms can be locking gas springs, which can be detuned with relatively light springs. Locking and unlocking the gas springs can be done by tabs or buttons on the gas springs themselves or can be done remotely by tabs or buttons that are connected to the gas springs by cables. For better cost effectiveness, one version can fixedly mount one or more of the arms with a solid link instead of a gas spring. Accordingly, operators can unlock the touchscreen display(s), move the touchscreen display(s) to position them within comfortable reach, sight, and to avoid screen glare, and then lock the touchscreen display(s) in that adjusted position.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An armrest system for an agricultural machine comprising:
   an armrest;
   a support attachment connected to the armrest;
   an arm in communication with the support attachment, the arm having an upper end and a lower end;
   a support assembly operatively connected to the upper end of the arm for holding a monitor, the support assembly including a ball and socket arrangement interconnecting the monitor to the arm;
   a collar interconnected to the lower end of the arm and extending about the support attachment, the collar configured to guide movement of the arm about an outer periphery of the support attachment;
   wherein:
   the support assembly is configured to allow movement of the a monitor in a plurality of directions; and
   the support assembly includes a support assembly lock configured to inhibit movement of the monitor when the support assembly lock is engaged.

2. The armrest system of claim 1, wherein the support attachment defines an axis and wherein the collar is rotatable about the axis defined by the support attachment.

3. The armrest system of claim 2, further comprising a rotation lock joined to the lower end of the arm, the rotation lock being configured to stop the rotation of the collar around the axis when the rotation lock is engaged.

4. The armrest system of claim 1, wherein the arm is a first arm and the monitor is a first monitor, and further comprising a second arm in communication with the support attachment, the second arm having an upper end providing a support assembly for holding a monitor;
   wherein:
   the support assembly of the second arm is configured to allow movement of the second monitor in a plurality of directions; and
   the support assembly includes a support assembly lock configured to inhibit movement of the second monitor when the support assembly lock is engaged.

5. The armrest system of claim 4, wherein the second arm includes a lower end joined to the support attachment, the lower end of the second being configured to independently rotate about an axis defined by the support attachment.

6. An armrest system for agricultural machine comprising:
   an armrest;
   a support attachment connected to the armrest; and
   an arm in communication with the support attachment, the arm having:
     an upper end providing a support assembly for holding a monitor; and
     a lower end joined to the support attachment and being rotatable about an axis defined by the support attachment;
   a rotation lock joined to the lower end of the arm, the rotation lock being configured to stop the rotation around the axis when the rotation lock is engaged;

wherein:
the support assembly is configured to allow movement of the monitor in a plurality of directions;
the support assembly includes a support assembly lock configured to inhibit movement of the monitor when the support assembly lock is engaged; and the lower end of the arm comprises a collar and a lobe extending from the collar.

7. The armrest system of claim 6, wherein the lobe includes a plurality of apertures with the rotation lock connected to at least one of the plurality of apertures.

8. An armrest system for an agricultural machine comprising:
an armrest;
a support attachment connected to the armrest; and
an arm in communication with the support attachment, the arm having:
an upper end providing a su ort assembly for holding a monitor; and
a lower end joined to the support attachment and being rotatable about an axis defined by the support attachment;
a rotation lock joined to the lower end of the arm, the rotation lock being configured to stop the rotation around the axis when the rotation lock is engaged;
wherein:
the support assembly is configured to allow movement of the monitor in a plurality of directions;
the support assembly includes a support assembly lock configured to inhibit movement of the monitor when the support assembly lock is engaged;
the rotation lock comprises a hydraulic cylinder; and
the support assembly comprises a ball and a socket.

9. The armrest system of claim 1, further comprising an instrument panel coupled to the armrest, wherein the instrument panel includes a plurality of controls.

10. An armrest system for an agricultural machine comprising:
an armrest;
a support attachment connected to the armrest;
a first arm in communication with the support attachment, the first arm having an upper end providing a support assembly for holding a first monitor; and
a second arm in communication with the support attachment, the second arm having an upper end providing a support assembly for holding a second monitor:
wherein:
the support assembly of the first arm is configured to allow movement of the first monitor in a plurality of directions;
the support assembly of the first arm includes a support assembly lock configured to inhibit movement of the first monitor when the support assembly lock is engaged;
the support assembly of the second arm is configured to allow movement of the provides movement for allowing a second monitor in to face a plurality of directions;
the support assembly of the second arm includes a support assembly lock configured to inhibit for inhibiting the movement of the second monitor when the support assembly lock of the support assembly of the second arm is engaged;
the first and second arms include lower ends joined to the support attachment, the lower ends being configured to independently rotate about an axis defined by the support attachment; and a first polymeric washer is disposed between the lower end of the first arm and the lower end of the second arm and a second polymeric washer is disposed between the support attachment and the lower ends of the first and second arms.

11. An armchair for an agricultural machine comprising:
a seat;
a backrest connected to the seat; and
an armrest system connected to the seat, the armrest system including:
an armrest;
a support attachment connected to the armrest;
an arm in communication with the support attachment, the arm having an upper end and a lower end;
a support assembly operatively connected to the upper end of the arm for holding a monitor, the support assembly including a ball and socket arrangement interconnecting the monitor to the arm; and
a collar interconnected to the lower end of the arm and extending about the support attachment, the collar configured to guide movement of the arm about an outer periphery of the support attachment;
wherein:
the support assembly is configured to allow movement of the monitor in a plurality of directions; and
the support assembly includes a support assembly lock configured to inhibit movement of the monitor when the support assembly lock is engaged.

12. The armchair of claim 11, wherein the support attachment defines an axis and wherein the collar is rotatable about the axis defined by the support attachment.

13. The armchair of claim 12, further comprising a rotation lock joined to the lower end, the rotation lock being configured to stop the rotation around the axis when the rotation lock is engaged.

14. The armrest system of claim 13, further comprising an instrument panel coupled to the armrest, wherein the instrument panel includes a plurality of controls.

15. An armchair for an agricultural machine comprising:
a seat;
a backrest connected to the seat; and
an armrest system connected to the seat, the armrest system including:
an armrest;
a support attachment connected to the armrest;
a first arm in communication with the support attachment, the first arm having an upper end including a ball and socket arrangement for interconnecting the first arm to a first monitor;
a second arm in communication with the support attachment, the second arm having an upper end including a ball and socket arrangement for interconnecting the second arm to a second monitor;
a first collar interconnected to a lower end of the first arm and extending about the support attachment, the first collar configured to guide movement of the first arm about an outer periphery of: the support attachment; and
a second collar interconnected to a lower end of the second arm and extending about the support attachment, the second collar configured to guide movement of the second arm about an outer periphery of the support attachment independently of movement of the first arm;

wherein:
the ball and socket arrangement of the first and second arms configured to allow movement of the first and second monitors, respectively, in a plurality of directions; and
each of the first and second arms include a support assembly lock configured to inhibit movement of the first and second monitors, respectively, when the support assembly lock is engaged.

16. An armchair for an agricultural machine comprising:
a seat;
a backrest connected to the seat; and
an armrest system connected to the seat, the armrest system including:
an armrest;
a support attachment connected to the armrest;
a first arm in communication with the support attachment, the first arm having an upper end providing a support assembly holding a first monitor; and
a second arm in communication with the support attachment, the second arm having an upper end providing a support assembly holding a second monitor;
wherein:
the support assemblies of the first and second arms configured to allow movement of the first and second monitors, respectively, in a plurality of directions;
each of the support assemblies of the first and second arms include a support assembly lock configured to inhibit movement of the first and second monitors, respectively, when the support assembly lock is engaged; and
the first and second arms include first and second lower ends, respectively, the first and second lower ends being joined to the support attachment and being configured to provide independent rotation around an axis defined by the support attachment.

17. The armchair of claim 16, further comprising a fastener aligned with the axis, the fastener being configured to join the first and second lower ends to the support attachment.

18. The armchair of claim 17, further comprising first and second rotation locks joined to the first and second lower ends, respectively, the first and second rotation locks being configured to stop the rotation of the first and second lower ends when the first and second rotation locks are engaged, respectively.

* * * * *